US008068314B1

(12) United States Patent
Pan et al.

(10) Patent No.: US 8,068,314 B1
(45) Date of Patent: Nov. 29, 2011

(54) HEAD STACK ASSEMBLY WITH SUSPENSION TAILS EXTENDING INTO INTERFERING SLITS IN A FLEXIBLE PRINTED CIRCUIT

(75) Inventors: Tzong-Shii Pan, San Jose, CA (US);
Shufun Ho, Fremont, CA (US);
Gregory Tran, Santa Clara, CA (US);
Fernando A. Magsombol, Muntinlupa (PH)

(73) Assignee: Western Digital Technologies, Inc., Irvine, CA (US)

( * ) Notice: Subject to any disclaimer, the term of this patent is extended or adjusted under 35 U.S.C. 154(b) by 450 days.

(21) Appl. No.: 12/406,830

(22) Filed: Mar. 18, 2009

(51) Int. Cl.
*G11B 5/55* (2006.01)

(52) U.S. Cl. .............. 360/264.2; 360/245.9; 360/266.3

(58) Field of Classification Search .............. 360/264.2, 360/245.9, 266.3
See application file for complete search history.

(56) References Cited

U.S. PATENT DOCUMENTS

| 5,422,764 | A | 6/1995 | McIlvanie |
| 5,644,448 | A * | 7/1997 | Suzuki ................... 360/97.01 |
| 5,668,684 | A | 9/1997 | Palmer et al. |
| 5,903,413 | A | 5/1999 | Brooks, Jr. et al. |
| 5,909,342 | A * | 6/1999 | Forbord et al. ............ 360/264.2 |
| 5,920,465 | A | 7/1999 | Tanaka |
| 6,145,188 | A | 11/2000 | Brooks, Jr. et al. |
| 6,185,075 | B1 | 2/2001 | Tsujino et al. |
| 6,212,046 | B1 | 4/2001 | Albrecht et al. |
| 6,399,889 | B1 | 6/2002 | Korkowski et al. |
| 6,529,350 | B1 | 3/2003 | Itoh |
| 6,634,086 | B2 | 10/2003 | Korkowski et al. |
| 7,110,222 | B2 | 9/2006 | Erpelding |
| 7,414,814 | B1 | 8/2008 | Pan |
| 7,907,369 | B1 * | 3/2011 | Pan ........................... 360/264.2 |
| 2007/0279807 | A1 | 12/2007 | Kobayashi et al. |
| 2008/0225439 | A1 * | 9/2008 | Komura ..................... 360/264.2 |
| 2010/0123976 | A1 * | 5/2010 | Freeman et al. ........... 360/264.2 |

* cited by examiner

*Primary Examiner* — Tan T. Nguyen

(57) ABSTRACT

A novel head stack assembly (HSA) is disclosed and claimed. The HSA includes an actuator including an actuator body and an actuator arm extending from the actuator body, and a flexible printed circuit (FPC) adjacent the actuator body. The FPC includes a slit therethrough. A head gimbal assembly (HGA) is attached to the actuator arm. The HGA includes a load beam, a laminated flexure attached to the load beam, and a head attached to the laminated flexure. The laminated flexure has a flexure tail that includes an intermediate region that is disposed adjacent the actuator arm, and a terminal region that is electrically connected to the FPC. The terminal region is substantially orthogonal to the intermediate region. The intermediate region of the flexure tail extends into the slit, interferes with the slit, and contacts and deforms the FPC adjacent the slit.

10 Claims, 6 Drawing Sheets

HEAD STACK ASSEMBLY WITH SUSPENSION TAILS EXTENDING INTO INTERFERING SLITS IN A FLEXIBLE PRINTED CIRCUIT

BACKGROUND OF THE INVENTION

1. Field of the Invention

The present invention relates generally to the field of information storage devices, and more particularly to head stack assemblies used in such devices.

2. Background of the Art

Information storage devices are used to retrieve and/or store data in computers and other consumer electronics devices. A magnetic hard disk drive is an example of an information storage device that includes one or more heads that can both read and write, but other information storage devices also include heads—sometimes including heads that cannot write.

In a modern magnetic hard disk drive device, each head is a sub-component of a head-gimbal assembly (HGA) that typically includes a laminated flexure to carry the electrical signals to and from the head. The HGA, in turn, is a sub-component of a head-stack assembly (HSA) that typically includes a plurality of HGAs, an actuator, and a flexible printed circuit (FPC). The plurality of HGAs are attached to various arms of the actuator, and each of the laminated flexures of the HGAs has a flexure tail that is electrically connected to the FPC.

Modern laminated flexures typically include conductive copper traces that are isolated from a stainless steel structural layer by a polyimide dielectric layer. So that the signals from/to the head can reach the flex cable on the actuator body, each HGA flexure includes a flexure tail that extends away from the head along the actuator arm and ultimately attaches to the FPC adjacent the actuator body. That is, the flexure includes traces that extend from adjacent the head and continue along the flexure tail to electrical connection points. The FPC includes conductive electrical terminals that correspond to the electrical connection points of the flexure tail.

To facilitate electrical connection of the conductive traces of the flexure tails to the conductive electrical terminals of the FPC during the HSA manufacturing process, the flexure tails must first be properly positioned relative to the FPC so that the conductive traces of the flexure tails are aligned with the conductive electrical terminals of the FPC. Then the flexure tails must be held or constrained to maintain proper alignment while the aforementioned electrical connections are made. Practically obtaining and maintaining such proper relative alignment in a high-volume manufacturing environment is a non-trivial challenge for manufacturers that require fast, cost-effective, and robust manufacturing processes to survive in a highly competitive industry.

Accordingly, there is a need in the art for improved HSA designs, to facilitate relative positioning and electrical connection of the conductive traces of a flexure tail to the conductive electrical terminals of an FPC during HSA manufacture.

SUMMARY

A novel head stack assembly (HSA) is disclosed and claimed. The HSA includes an actuator including an actuator body and an actuator arm extending from the actuator body, and a flexible printed circuit (FPC) adjacent the actuator body. The FPC includes a slit therethrough. A head gimbal assembly (HGA) is attached to the actuator arm. The HGA includes a load beam, a laminated flexure attached to the load beam, and a head attached to the laminated flexure. The laminated flexure has a flexure tail that includes an intermediate region that is disposed adjacent the actuator arm, and a terminal region that is electrically connected to the FPC. The terminal region is substantially orthogonal to the intermediate region. The intermediate region of the flexure tail extends into the slit, interferes with the slit, and contacts and deforms the FPC adjacent the slit.

DETAILED DESCRIPTION OF EXEMPLARY EMBODIMENTS

Figure 1:
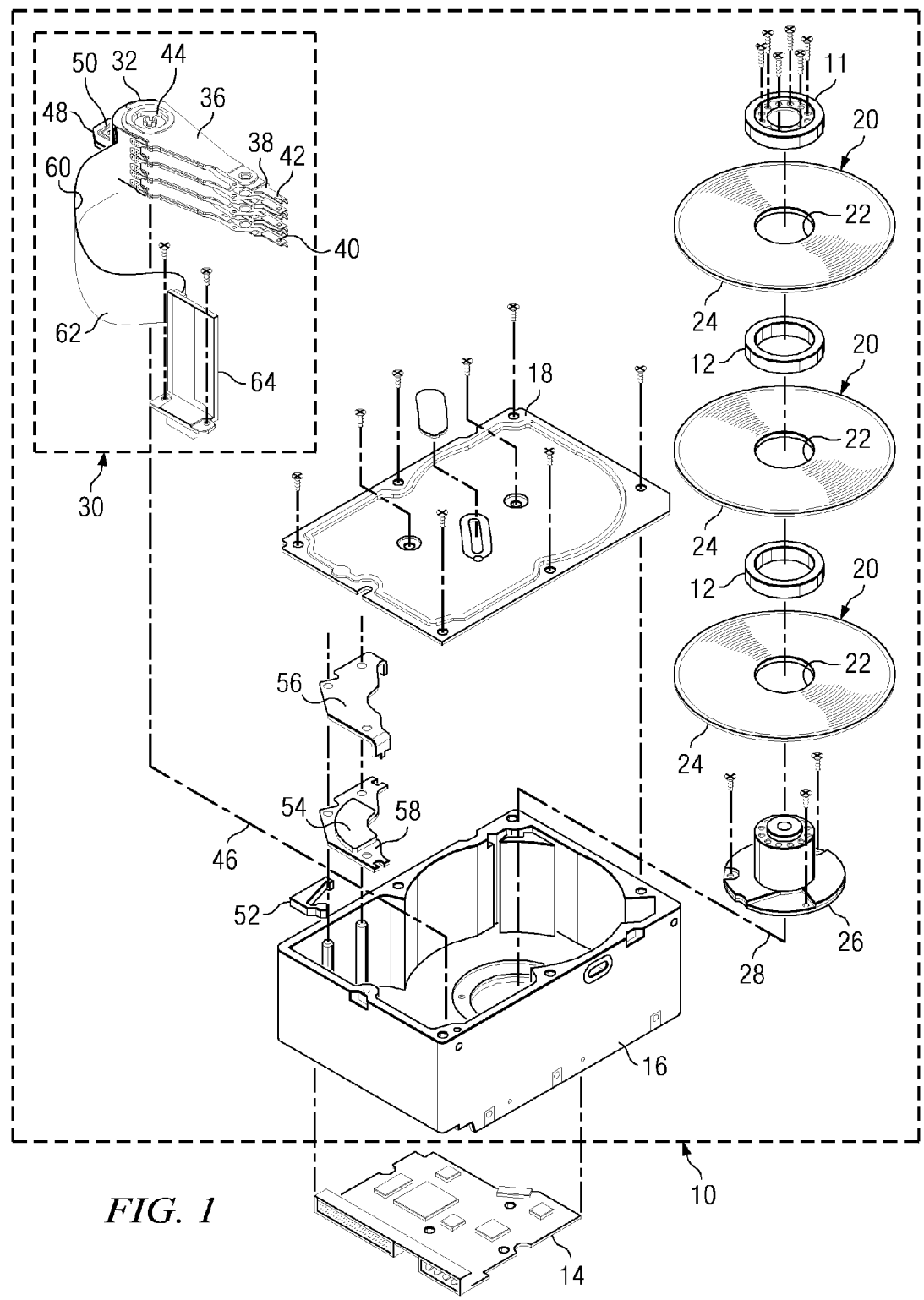
FIG. 1 is an exploded perspective view of a disk drive according to an embodiment of the present invention.

FIG. 1 is an exploded perspective view of a disk drive according to an embodiment of the present invention. The disk drive includes a head disk assembly (HDA) 10 and a printed circuit board assembly (PCBA) 14. The HDA 10 includes a base 16 and cover 18 that together house at least one annular magnetic disk 20. Each disk 20 contains a plurality of magnetic tracks for storing data. The tracks are disposed upon opposing first and second disk surfaces of the disk 20 that extend between an inner disk edge 22 (corresponding to the inner diameter) and an outer disk edge 24 (corresponding to the outer diameter) of the disk 20. The head disk assembly 10 further includes a spindle motor 26 for rotating the disk 20 about a disk axis of rotation 28. The spindle motor 26 includes a spindle motor hub that is rotatably attached to the base 16 of the HDA 10. Disks 20 may be stacked and separated with one or more annular disk spacers 12 that are disposed about the hub, all held fixed to the hub by disk clamp 11.

The HDA 10 further includes a head stack assembly (HSA) 30 rotatably attached to the base 16 of HDA 10. The HSA 30 includes an actuator comprising an actuator body 32 and one or more actuator arms 36 extending from the actuator body 32. The actuator body 32 includes a bore 44 and a pivot bearing cartridge engaged within the bore for facilitating the HSA 30 to rotate relative to HDA 10 about actuator pivot axis 46. One or two head gimbal assemblies (HGA) 38 are attached to a distal end of each actuator arm 36. Each HGA includes a head (e.g. head 40) for reading and writing data from and to the disk 20, and a load beam 42 to compliantly preload the head against the disk 20. The HSA 30 further includes a coil support 48 that extends from one side of the HSA 30 that is opposite head 40. The coil support 48 is configured to support a coil 50 through which a changing electrical current is passed. The coil 50 interacts with one or more magnets 54 that are attached to base 16 via a yoke structure 56, 58 to form a voice coil motor for controllably rotating the HSA 30. HDA 10 includes a latch 52 rotatably mounted on base 16 to prevent undesired rotations of HSA 30.

The PCBA 14 includes a servo control system for generating servo control signals to control the current through the coil 50 and thereby position the HSA 30 relative to tracks disposed upon surfaces of disk 20. The HSA 30 is electrically connected to PCBA 14 via a flexible printed circuit (FPC) 60, which includes a flex cable 62 and a flex cable support bracket 64. The flex cable 62 supplies current to the coil 50 and carries signals between the HSA 30 and the PCBA 14.

In the magnetic hard disk drive of FIG. 1, the head 40 includes a body called a "slider" that carries a magnetic transducer on its trailing end (not visible given the scale of FIG. 1). The magnetic transducer may include an inductive write element and a magnetoresistive read element. During operation the transducer is separated from the magnetic disk by a very thin hydrodynamic air bearing. As the motor 26 rotates the magnetic disk 20, the hydrodynamic air bearing is formed between an air bearing surface of the slider of head 40, and a surface of the magnetic disk 20. The thickness of the air bearing at the location of the transducer is commonly referred to as "flying height."

Figure 2:
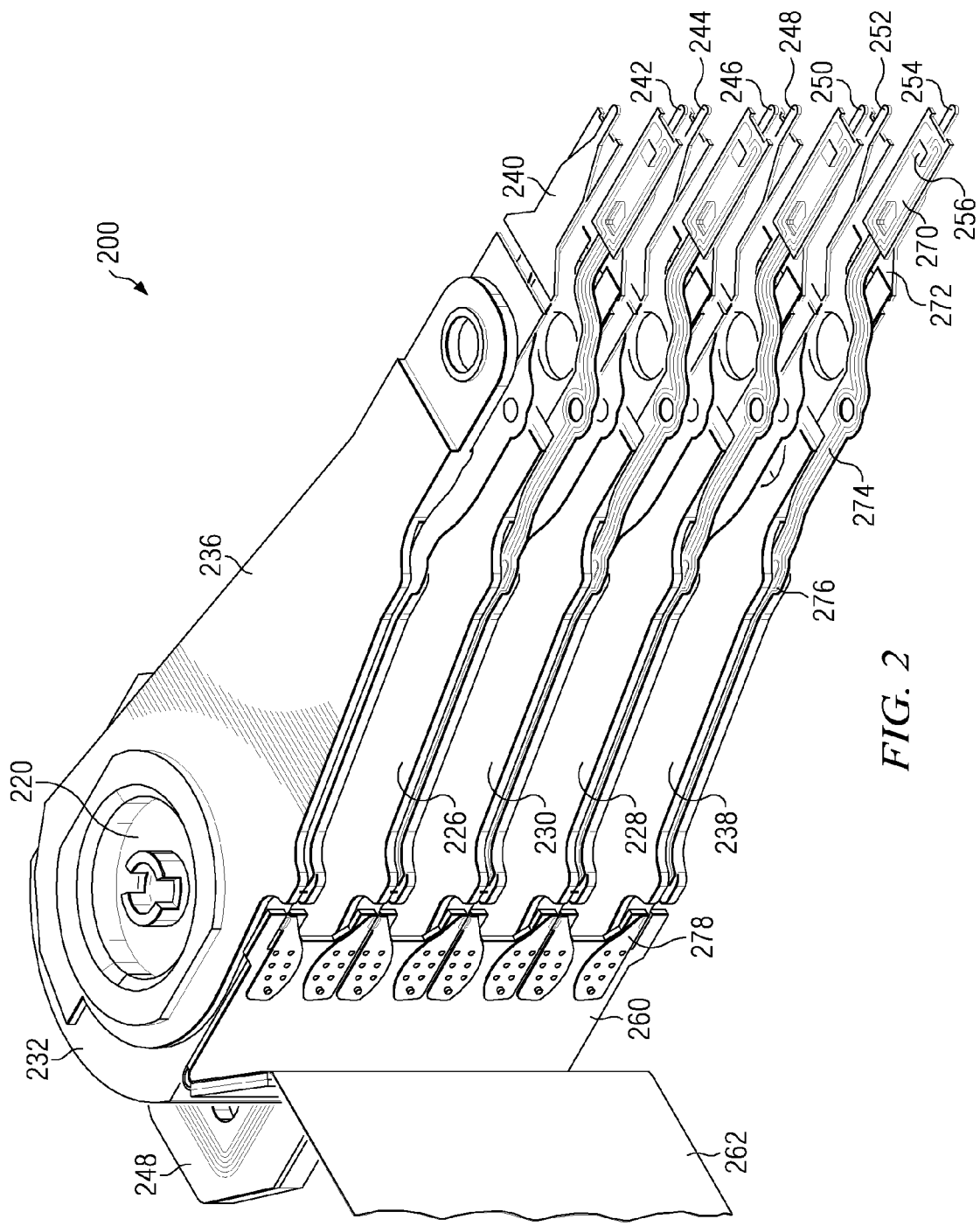
FIG. 2 is a perspective view of a head stack assembly (HSA) according to an embodiment of the present invention.

FIG. 2 is a perspective view of a head stack assembly (HSA) 200 according to an embodiment of the present invention. The HSA 200 includes an actuator body 232 and a plurality of actuator arms 226, 228, 230, 236, 238 extending from the actuator body 232. The actuator body 232 includes a pivot bearing cartridge 220 and a coil support 248 extends from the actuator body in a direction that is generally opposite the actuator arms 226, 228, 230, 236, 238. The HSA 200 also includes a plurality of head gimbal assemblies (HGA) 240, 242, 244, 246, 248, 250, 252, 254, attached to the actuator arms 226, 228, 230, 236, 238. Note that each of the inner actuator arms 226, 228, 230 includes two HGAs, while each of the outer actuator arms 236, 238, includes only one HGA. This is because in a fully populated disk drive the inner arms are positioned between disk surfaces while the outer actuator arms are positioned over (or under) a single disk surface. In a depopulated disk drive, however, any of the actuator arms may have one or zero HGAs, possibly replaced by a dummy mass.

Each HGA includes a head for reading and/or writing to an adjacent disk surface (e.g. HGA 254 includes head 256). The head 256 is attached to a laminated flexure 270, which is attached to a load beam 272. The laminated flexure 270 may include a structural layer (e.g. stainless steel), a dielectric layer (e.g. polymide), and a conductive layer into which traces are patterned (e.g. copper). The HSA 200 also includes a flexible printed circuit (FPC) 260 adjacent the actuator body 232, and the FPC 260 includes a flex cable 262. The FPC 260 may comprise a laminate that includes two or more conventional dielectric and conductive layer materials (e.g. one or more polymeric materials, copper, etc). The laminated flexure 270 includes a flexure tail 274 that includes an intermediate region 276 that is disposed adjacent the actuator arm 238, and a terminal region 278 that is electrically connected to the FPC 260.

Figure 3A:
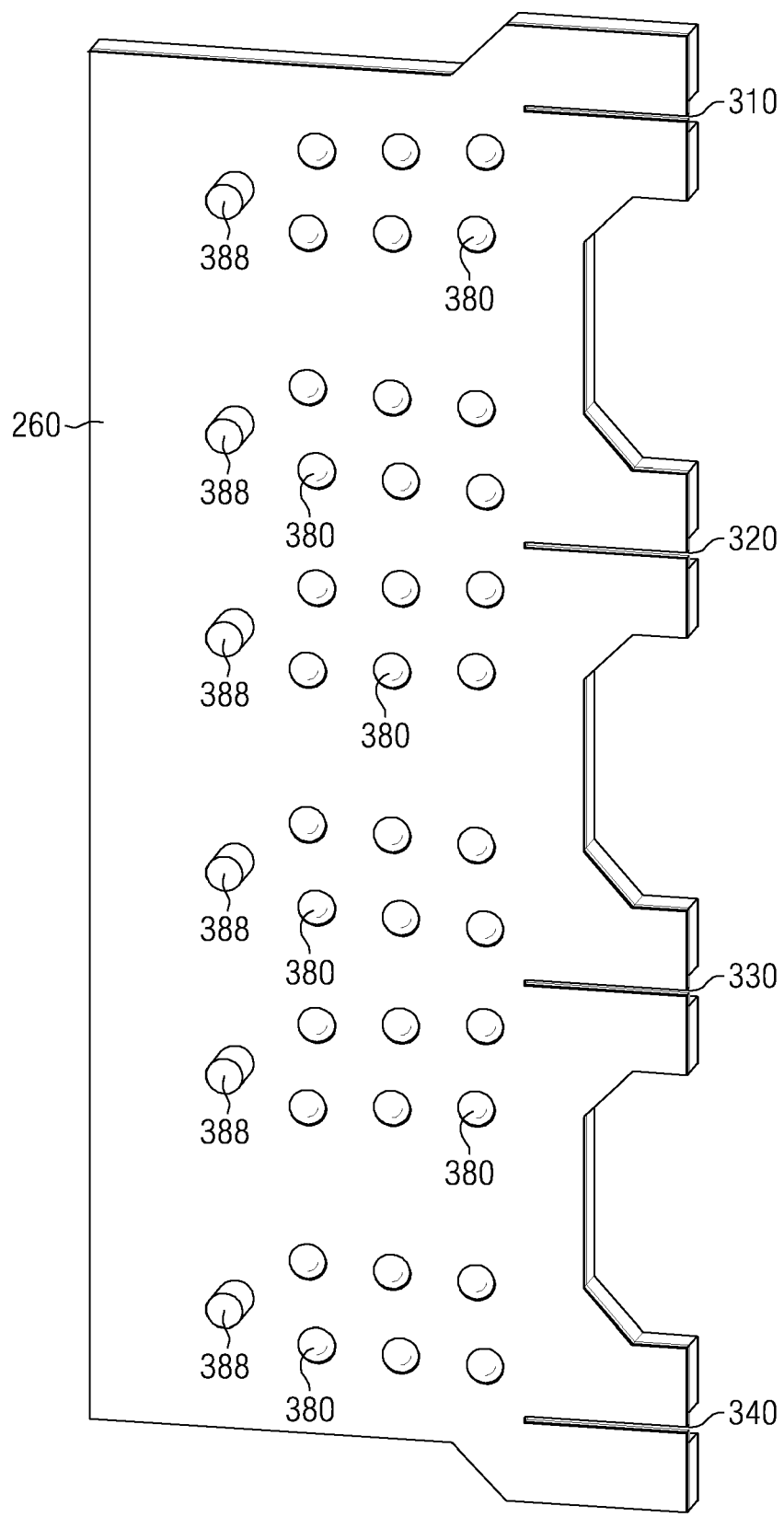
FIG. 3A is a perspective view of a portion of a flexible printed circuit (FPC) according to an embodiment of the present invention.

Methods of electrical connection of the flexure tails to the FPC 260 include solder reflow and solder ball jet (SBJ), and are preferably automated. To electrically connect and securely attach the flexure tails to the FPC 260, the flexure tails must first be aligned with and positioned on or adjacent the FPC 260, and then held in alignment (at least temporarily) while electrical connection is established and secure attachment is completed. To accomplish this according to certain embodiments of the present invention, certain structural features are created in the FPC 260. For example, as shown in FIG. 3A, the FPC 260 includes a plurality of slits therethrough 310, 320, 330, 340, and optionally includes a plurality of alignment posts 388.

Figure 3B:
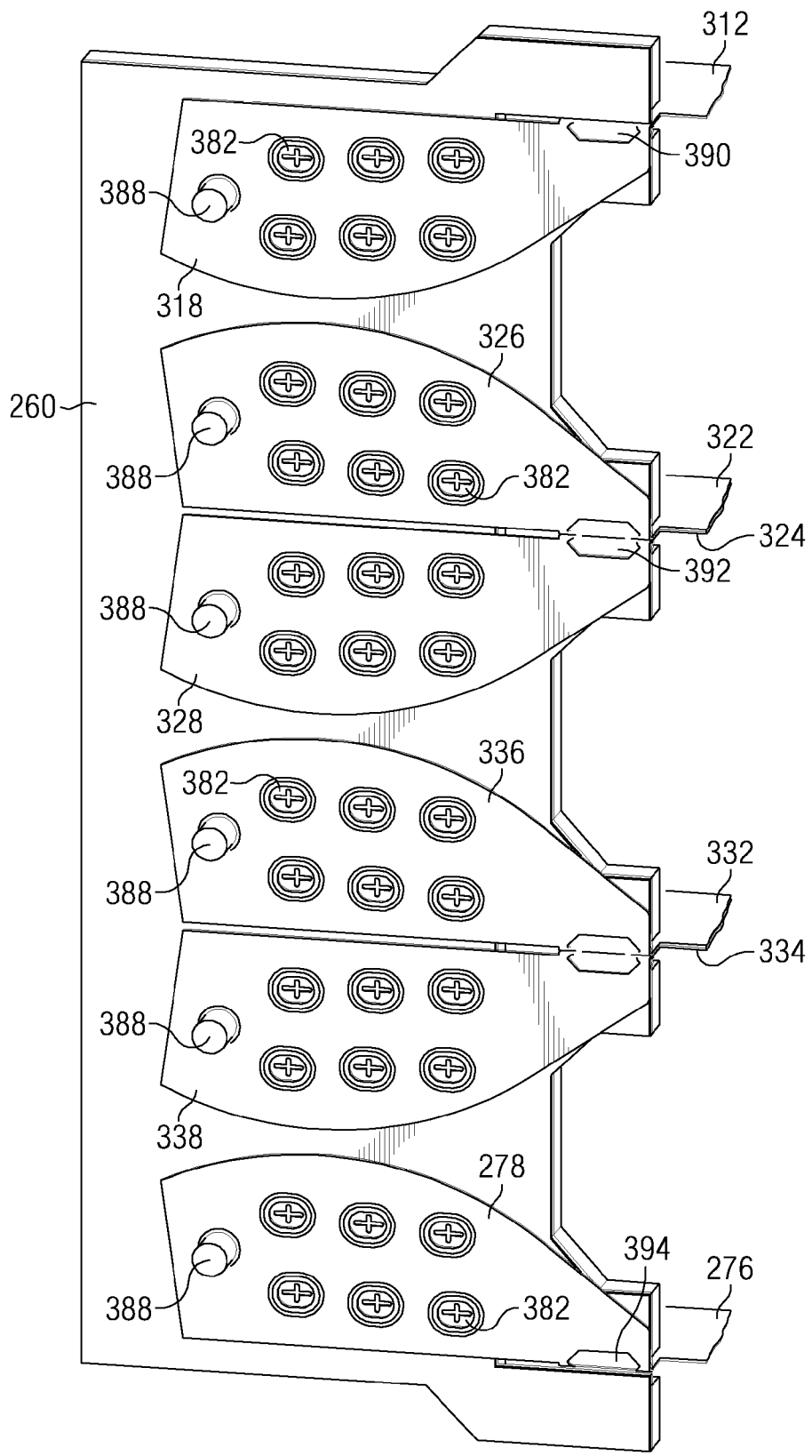
FIG. 3B is a perspective view of a plurality of flexure tail terminal regions attached to the FPC portion of FIG. 3A, according to an embodiment of the present invention.

FIG. 3B is a perspective view of a plurality of flexure tail terminal regions 278, 318, 326, 328, 336, 338 that are electrically connected to the FPC 260. Specifically, the FPC 260 includes electrical conduits that terminate at electrical connection points 380 (shown in FIG. 3A) which are aligned with and connected to electric terminals 382 of the terminal regions 278, 318, 326, 328, 336, 338 of the HGA flexure tails.

As shown in FIG. 3B, each of the flexure tail terminal regions 278, 318, 326, 328, 336, 338 optionally includes an alignment hole to accommodate the alignment posts 388. Moreover, each of the flexure tail intermediate regions 276, 312, 322, 324, 332, 334 extends into one of the slits 310, 320, 330, 340, interferes with that slit, and contacts and deforms the FPC 260 adjacent that slit. Note that the middle slits 320, 330 (that are aligned with the middle actuator arms) each accept the insertion of two flexure tail intermediate regions (322 and 324, 332 and 334, respectively), while the outside slits 340, 310 (that are aligned with the outside actuator arms) each accept the insertion of one flexure tail intermediate region (276 and 312, respectively). Note also that each of the flexure tails is bent near a corresponding slit so that each of the flexure tail terminal regions 278, 318, 326, 328, 336, 338 is substantially orthogonal to the intermediate region 276, 312, 322, 324, 332, 334 of the same flexure tail. In the embodiment of FIG. 3B, such bending may be facilitated by an optional hexagonal opening (e.g. hexagonal opening 390, 392, or 394) extending through each of the flexure tails that is depicted.

Figure 4B:
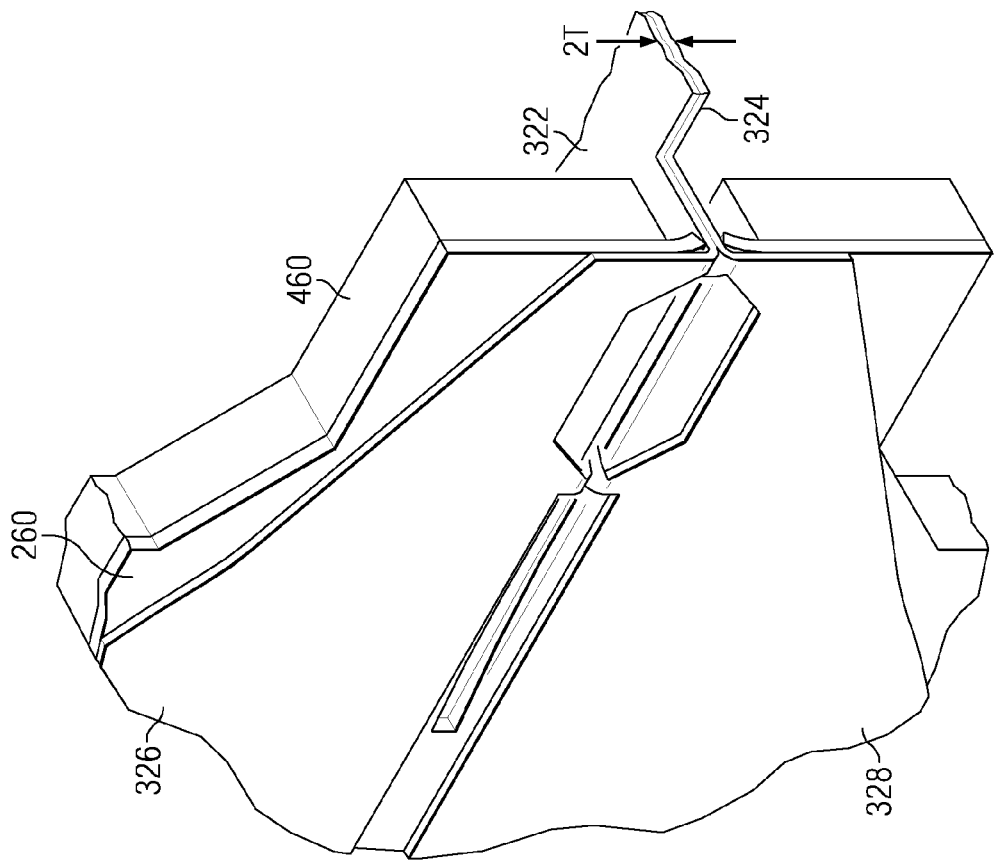
FIG. 4B depicts a close up perspective view of two flexure tail intermediate regions inserted in the FPC slit of FIG. 4A, according to an embodiment of the present invention.
Figure 4A:
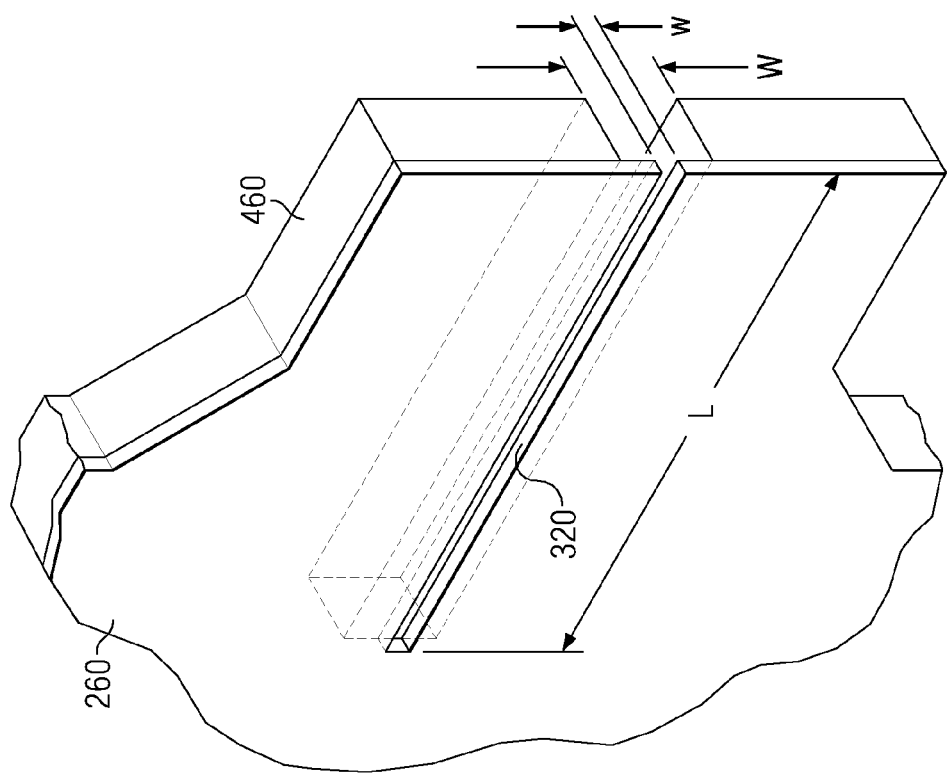
FIG. 4A depicts a close up perspective view of an inner FPC slit, according to an embodiment of the present invention.

FIG. 4A depicts a close up perspective view of the FPC slit 320, and FIG. 4B depicts a close up perspective view of the two flexure tail intermediate regions 322, 324 inserted in the FPC slit 320. As shown in FIG. 4A the slit 320 defines a slit length L and a slit width w. As shown in FIG. 4B, twice the laminated flexure thickness 2T exceeds the slit width w so that the intermediate regions 322, 324 of the flexure tails together interfere with the slit 320, and contact and deform the FPC 260 adjacent the slit 320. In the embodiment of FIG. 4B, the contact between each of the flexure tail intermediate regions 322, 324 and the FPC slit 320 is substantially a line contact between a surface of the intermediate region 322, 324 and one of the edges of the FPC slit 320. In certain embodiments, the laminated flexure thickness T is the same for all of the laminated flexures, and is preferably in the range 30 to 50 microns, for example.

Note that in the embodiment of FIGS. 4A and 4B, the HSA also includes a FPC stiffener 460 that is thicker than the FPC 260 adjacent the slit. The FPC stiffener 460 may be fabricated from aluminum, stainless steel, or plastic, for example. The FPC stiffener 460 includes a slot that runs along the FPC slit 320, the slot having a slot width W that exceeds the slit width w enough to allow deformation of the FPC 260 adjacent the FPC slit 320. Such deformation accommodates the insertion of a flexure tail intermediate region. For example in the case of FPC slit 320, the deformation accommodates insertion of the two flexure tail intermediate regions 322, 324. The deformation of the FPC 260 adjacent the FPC slit 320 also serves to preload the edges of the FPC slit 320 against the flexure tail intermediate regions 322, 324, so as to better retain them (for a period) during HSA assembly. Note that each of the FPC slits 340, 310 (that are aligned with the outside actuator arms) accommodates only a single flexure tail intermediate region (276 and 312, respectively). Therefore, if the FPC slits 340, 310 have the same slit width w (as do FPC slits 320, 330), then the interference between FPC slits 340, 310 and the corresponding flexure tail intermediate region (276 and 312, respectively) will be half of that expected for the FPC slits 320, 330. Consequently, the preload retaining the flexure tail intermediate regions 276 and 312 will be less than that which retains the flexure tail intermediate regions 322, 324, 332, 334.

Alternatively, the FPC slits 340, 310 may be designed to have a slit width w' that is less than w (the slit width of the FPC slits 320, 330), so that the interference and preload retaining the various FPC intermediate regions can be more uniform. For example, in certain embodiments the slit width w' of each of the FPC slits 340, 310 is preferably in the range 10 to 40 microns while the slit width w of each of the FPC slits 320, 330 is preferably the range 40 to 80 microns. Such an embodiment is depicted in FIGS. 5A and 5B.

Figure 5B:
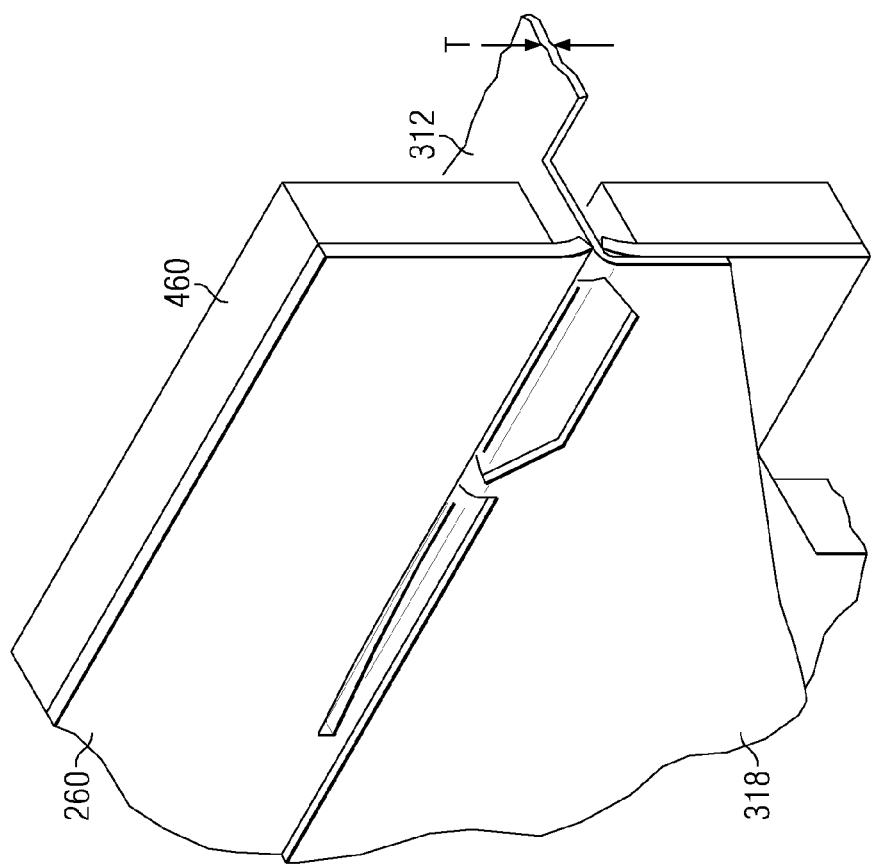
FIG. 5B depicts a close up perspective view of a flexure tail intermediate region inserted in the FPC slit of FIG. 5A, according to an embodiment of the present invention.
Figure 5A:
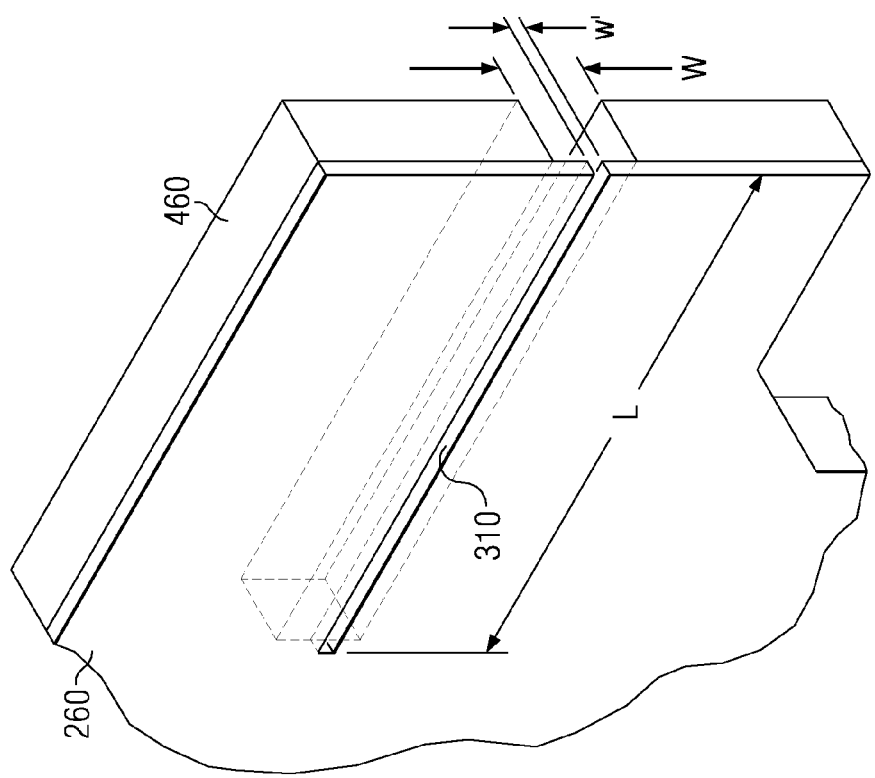
FIG. 5A depicts a close up perspective view of an outer FPC slit, according to an embodiment of the present invention.

FIG. 5A depicts a close up perspective view of the FPC slit 310, and FIG. 5B depicts a close up perspective view of the flexure tail intermediate region 312 inserted in the FPC slit 310. As shown in FIG. 5A the slit 310 defines a slit length L and a slit width w'. As shown in FIG. 5B, the laminated flexure thickness T exceeds the slit width w' so that the intermediate region 312 interferes with the slit 310, and contacts and deforms the FPC 260 adjacent the slit 310. Note that the slit width w' of the slit 310 shown in FIG. 5A is less than the slit width w of the slit 320 shown in FIG. 4A. In the embodiment of FIG. 5B, the contact between the flexure tail intermediate region 312 and the FPC slit 310 is substantially a line contact between a surface of the intermediate region 312 and two edges of the FPC slit 310.

Now again referring to the embodiment shown in FIGS. 3A and 3B, each of the flexure tail intermediate regions 276, 312 will be retained by contact with two edges of the respective FPC slit (340, 310, respectively), while each of the flexure tail intermediate regions 322, 324, 332, 334 will be contacted by only a single edge of its respective FPC slit (320, 330, respectively). Therefore, in certain embodiments, it may be acceptable for the interference and preload associated with FPC slits 340, 310 to be significantly less than that associated with the FPC slits 320, 330. In such embodiments, in the interest of uniformity of the manufacturing method used to cut, etch, or otherwise create the FPC slits, it may be preferable to choose all of the FPC slits 310, 320, 330, 340 to have the same pre-deformation slit width w. For example, the FPC slits may all be created by a cutting tool that cuts and deforms the FPC 260 adjacent the slits, so that the slit width of each of the FPC slits 310, 320, 330, 340 (if the deformation adjacent the slits were to be removed) would be zero or nearly zero. In such an embodiment, the forced insertion of the flexure tail intermediate regions into the slits deforms each slit further, so that the subsequent deformation of the FPC slits 320 and 330 will end up being approximately twice the subsequent deformation of the FPC slits 340 and 310.

In the foregoing specification, the invention is described with reference to specific exemplary embodiments, but those skilled in the art will recognize that the invention is not limited to those. It is contemplated that various features and aspects of the invention may be used individually or jointly and possibly in a different environment or application. The specification and drawings are, accordingly, to be regarded as illustrative and exemplary rather than restrictive. "Comprising," "including," and "having," are intended to be open-ended terms.

What is claimed is:

1. A head stack assembly (HSA) comprising:
   an actuator including an actuator body and an actuator arm extending from the actuator body;
   a flexible printed circuit (FPC) adjacent the actuator body, the FPC including a slit therethrough;
   a head gimbal assembly (HGA) attached to the actuator arm, the HGA including
   a load beam;
   a laminated flexure attached to the load beam;
   a head attached to the laminated flexure;
   the laminated flexure including a flexure tail that includes an intermediate region that is disposed adjacent the actuator arm and a terminal region that is electrically connected to the FPC, the terminal region being substantially orthogonal to the intermediate region; and
   wherein the intermediate region of the flexure tail extends into the slit, interferes with the slit, and contacts and deforms the FPC adjacent the slit.

2. The HSA of claim 1, wherein the laminated flexure defines a laminated flexure thickness and the slit defines a slit length and a slit width, and wherein the laminated flexure thickness exceeds the slit width so that the intermediate region of the flexure tail interferes with the slit, and contacts and deforms the FPC adjacent the slit.

3. The HSA of claim 2, wherein the laminated flexure thickness is in the range 30 to 50 microns and the slit width is in the range 10 to 40 microns.

4. The HSA of claim 1, further comprising:
   a second HGA having a second load beam, a second laminated flexure attached to the second load beam, and a second head attached to the second laminated flexure;
   the second laminated flexure including a second flexure tail that includes a second intermediate region and a second terminal region that is electrically connected to the FPC, the second terminal region being substantially orthogonal to the second intermediate region, and
   wherein the second intermediate region of the second flexure tail also extends into the slit, interferes with the slit, and contacts and deforms the FPC adjacent the slit.

5. The HSA of claim 4, wherein the laminated flexure defines a laminated flexure thickness and the second laminated flexure defines a second laminated flexure thickness, and the slit defines a slit length and a slit width, and wherein the slit width is less than the sum of the first and second laminated flexure thicknesses, so that the first and second intermediate regions together interfere with the slit and deform the FPC adjacent the slit, and so that each of the first and second intermediate regions is in contact with the FPC at the slit.

6. The HSA of claim 5, wherein the laminated flexure thickness is equal to the second laminated flexure thickness.

7. The HSA of claim 6, wherein the laminated flexure thickness is in the range 30 to 50 microns and the slit width is in the range 40 to 80 microns.

8. The HSA of claim 1, wherein the FPC includes a stiffener, but not at the location of the slit, the stiffener being thicker than the FPC adjacent the slit.

9. The HSA of claim 8, wherein the stiffener comprises a metal selected from the group consisting of aluminum and stainless steel.

10. The HSA of claim 1, wherein the contact is substantially a line contact between a surface of the intermediate region and an edge of the slit.

* * * * *